United States Patent [19]

Hill

[11] Patent Number: 5,060,390
[45] Date of Patent: Oct. 29, 1991

[54] NAVIGATION AID

[75] Inventor: David C. Hill, Oakville, Canada

[73] Assignee: Navitrak Corp., Oakville, Canada

[21] Appl. No.: 471,943

[22] Filed: Jan. 29, 1990

[51] Int. Cl.[5] .................. G01C 17/02; G01C 21/00
[52] U.S. Cl. .................. 33/1 SD; 33/355 R; 353/12; 40/363; 359/809
[58] Field of Search .......... 33/1 SB, 1 SD, 1 SA, 33/ 1 SC, 352, 355 R, 364, 348; 350/235, 237, 238, 241, 243, 244; 353/11, 12, 39; 40/361, 363, 366

[56] References Cited

U.S. PATENT DOCUMENTS

| | | | |
|---|---|---|---|
| 1,833,595 | 11/1931 | Samson et al. | |
| 2,114,652 | 4/1938 | Dalton | 33/1 SD |
| 2,336,789 | 12/1943 | Jonsson | 33/364 |
| 2,421,077 | 5/1947 | Miller | 353/12 |
| 2,513,072 | 6/1950 | Westenfelder | 353/12 |
| 2,618,856 | 11/1952 | Sweet | 33/1 SD |
| 2,787,070 | 4/1957 | Idoine | 40/86 |
| 3,094,781 | 6/1963 | Vangor | 33/1 SD |
| 3,570,445 | 3/1971 | Johnson | 116/29 |
| 3,713,236 | 1/1973 | Fields | 40/33 |
| 3,724,079 | 4/1973 | Jasperson et al. | 33/1 SD |
| 3,826,579 | 7/1974 | Schurgin | 356/247 |
| 3,844,041 | 10/1974 | Wilson, Jr. | 33/1 SD |
| 3,983,630 | 10/1976 | Hamm et al. | 33/1 SD |
| 4,157,626 | 6/1979 | Bedinghaus | 40/518 |
| 4,422,738 | 12/1983 | Steele | 350/241 |
| 4,442,605 | 4/1984 | Weihe | 33/1 SD |
| 4,506,950 | 3/1985 | Crossman | 350/238 |

FOREIGN PATENT DOCUMENTS

| | | | |
|---|---|---|---|
| 662759 | 8/1929 | France | 33/1 SD |
| 914892 | 10/1946 | France | 33/1 SD |
| 93227 | 11/1938 | Sweden | 33/1 SD |

Primary Examiner—Thomas B. Will
Attorney, Agent, or Firm—Volpe and Koenig

[57] ABSTRACT

A navigation device is disclosed, having a lens across an opening at one end of a case, and a compass across an opening at the opposite end of the case. A transparency holder is positioned between the lens and the compass, adapted to receive a map transparency with magnetic north thereon aligning with a north marking on the body of the compass, at a distance from the lens approximating the focal length of the lens. A grid wheel is provided between the transparency holder and the compass, having a transparent or translucent central area inscribed with parallel grid lines and at least one first directional arrow aligned parallel to the grid lines, the grid wheel being in close proximity to the transparency holder such that it is also at a distance from the lens approximating the focal length of the lens. Positioned between the grid wheel and the compass, and geared to the grid wheel for counter-rotation therewith, is a direction wheel having a transparent or translucent central area inscribed with at least one second directional arrow. A bearing may thus be taken by examining an installed map transparency through the lens, rotating the grid wheel and direction wheel to align the grid lines and the at least one first directional arrow with the desired direction of travel on the map, then aligning the compass needle with the north marking on the body of the compass, the at least one second directional arrow then indicating the bearing to be taken.

11 Claims, 6 Drawing Sheets

NAVIGATION AID

BACKGROUND OF THE INVENTION

1. Field of the Invention

This invention relates generally to navigation aids and devices, and particularly to a device for converting map bearings to provide an indication of the true land or sea bearing.

In reading a map and navigating with a compass, amateur or occasional navigators frequently fail to properly account for magnetic declination, either by neglecting it entirely, or by taking it in the wrong direction, thus producing an error of twice the magnetic declination. More seriously, amateur or occasional navigators may align the compass needle incorrectly or misinterpret the reading or make other similar errors to produce a 180 degree error.

There is a need for a navigation device which facilitates relatively foolproof conversion of map data into a land or sea bearing to be taken.

2. Description of the Prior Art

Some prior art devices have used map transparencies mounted in a frame with a lens and rotatable grid, to facilitate obtaining a map bearing. For example, see U.S. Pat. No. 3,094,781 (Vangor, 1963).

However, such devices generally accomplish no more than can be accomplished using a protractor on a laid-out paper map, i.e. they merely provide a map bearing. There remains the problem of using a compass to convert the map bearing to the true land or sea bearing.

SUMMARY OF THE INVENTION

It is thus an object of the invention to provide a navigation device which facilitates relatively foolproof conversion of map data into a land or sea bearing to be taken.

Thus in the invention, a grid, a map transparency and a compass are combined such that map information can be directly converted to a land or sea bearing in virtually foolproof fashion.

More particularly, the invention involves, mounted in a case parallel to and aligned with each other, a lens across an opening at one end of the case and a compass, having a body, transparent faces and a magnetic compass needle, across an opening at the opposite end of the case. A transparency holder is positioned between the lens and the compass, adapted to receive a map transparency with magnetic north thereon aligning with a north marking on the body of the compass, at a distance from the lens approximating the focal length of the lens. A grid wheel is provided between the transparency holder and the compass, having a transparent or translucent central area inscribed with parallel grid lines and at least one first directional arrow aligned parallel to the grid lines, the grid wheel being in close proximity to the transparency holder such that it is also at a distance from the lens approximating the focal length of the lens. Positioned between the grid wheel and the compass, and geared to the grid wheel for counter-rotation therewith, is a direction wheel having a transparent or translucent central area inscribed with at least one second directional arrow, the two directional arrows aligning with each other when pointing at the North marking or 180 degrees therefrom. A bearing may thus be taken by examining an installed map transparency through the lens, rotating the grid wheel and direction wheel to align the grid lines and the at least one first directional arrow with the desired direction of travel on the map, then aligning the compass needle with the north marking on the body of the compass, the at least one second directional arrow then indicating the bearing to be taken.

Alternatively, as described below, the map transparency may be positioned between the grid wheel and the direction wheel, adjacent the grid wheel.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
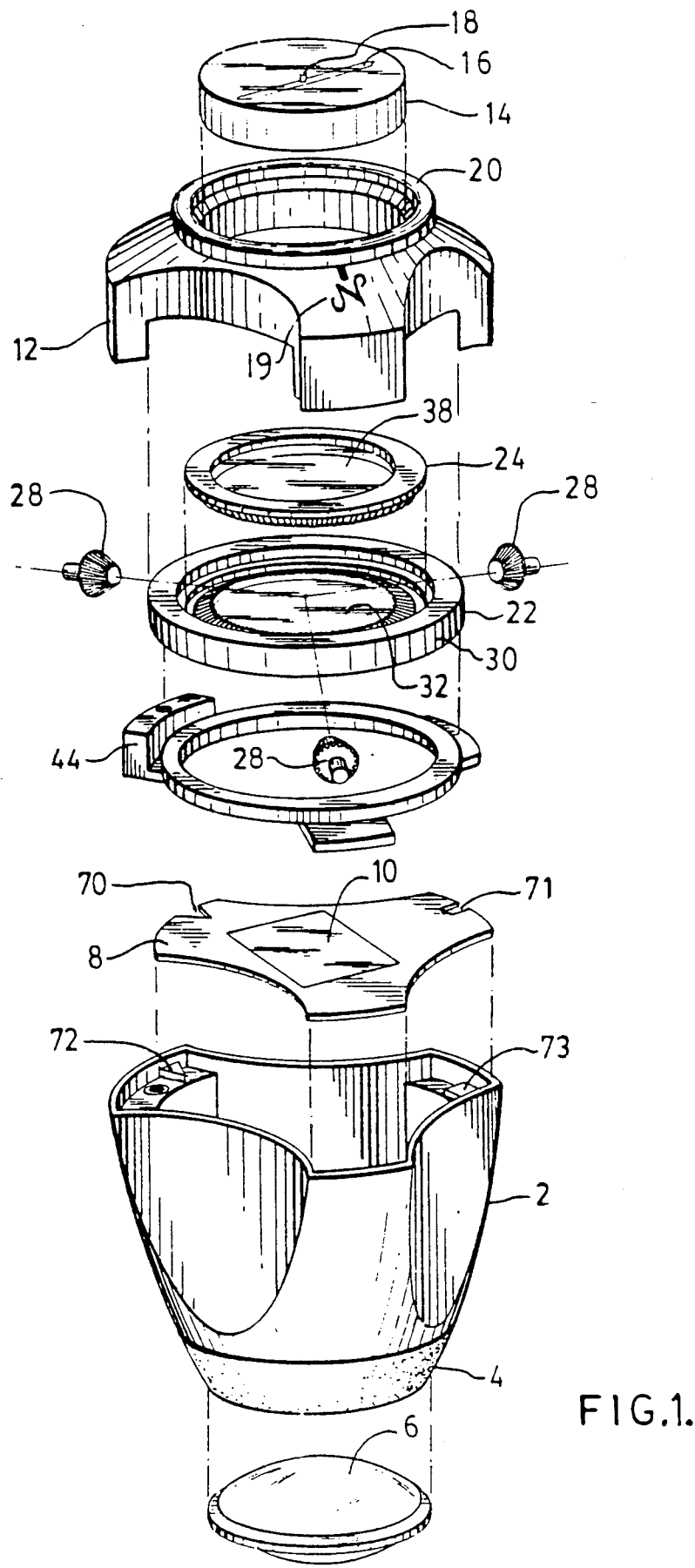
FIG. 1 is an exploded perspective, showing the various components of the device.
Figure 2:
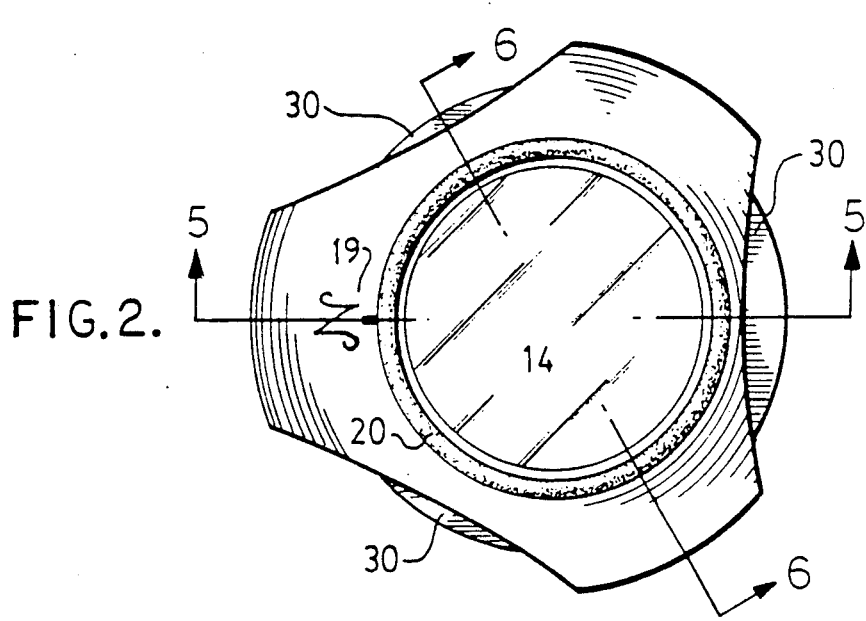
FIG. 2 is a top view.
Figure 3:
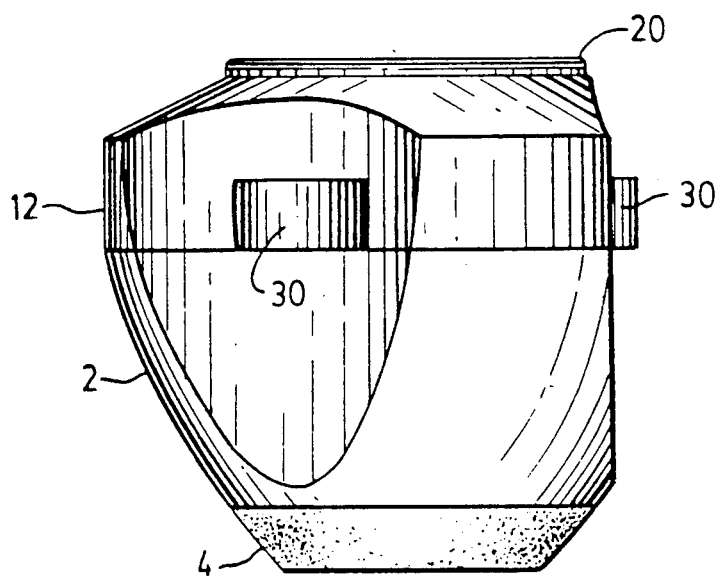
FIG. 3 is a front elevation.
Figure 4:
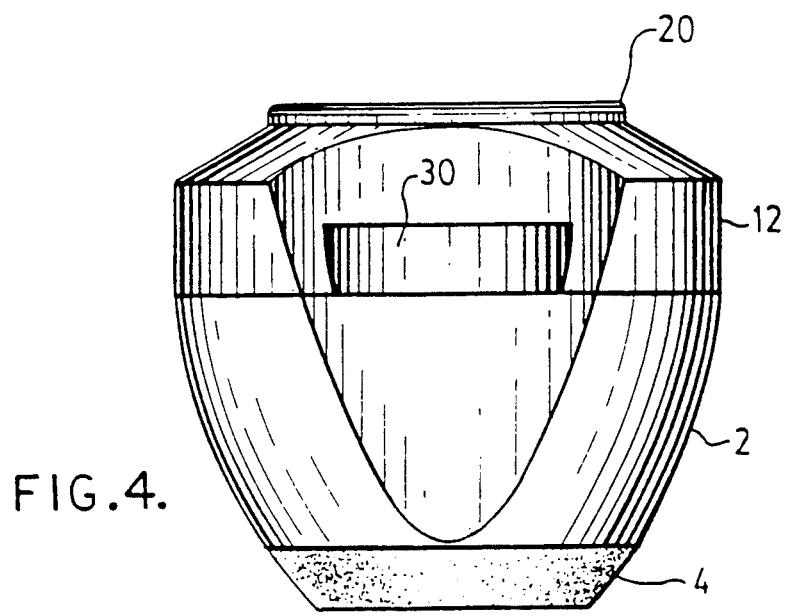
FIG. 4 is side elevation.

In the preferred embodiment, the invention is embodied in a case, comprising a lower casing 2 and an upper casing 12. Mounted across the bottom end of the lower casing 2 in a rubber eye piece 4 is a lens 6. A transparency holder 8 is positioned across the upper end of the lower casing, to receive a map transparency 10. The transparency holder is at a distance from the lens approximating the focal length of the The upper casing 12 is removably fastened to the lower casing 2. A conventional compass 14, having a compass needle 16 mounted on a pin 18, is positioned across the upper end of the upper casing. A "North" or "N" marking, or other suitable indicator, is on the upper surface of the compass or, as illustrated in FIG. 1, on the upper casing adjacent the compass. A rubber ring 20 projects axially from the upper end of the upper casing to protect the casing and compass.

A grid wheel 22 and a direction wheel 24 are mounted between the upper and lower casings. The wheels have gear-teethed areas 26. Small gears 28, preferably three in number, are evenly spaced in fixed positions between the gear-teethed areas, rotation of one wheel thus producing counter-rotation of the other. One of the wheels, namely the grid wheel 22 in the illustrated embodiment, has a ring portion 30 projecting outwarding from at least a portion of the upper and lower casings, for use by the user to rotate the wheels.

The grid wheel 22 has a transparent or translucent central portion 32, inscribed with parallel grid lines 34 and at least one first directional arrow 36 aligned parallel to the grid lines. It is in close proximity to the transparency holder, such that it is also at a distance from the lens approximating the focal length of the lens. Thus when the user looks through the lens, both the map transparency and the grid lines are essentially in focus.

The direction wheel 24 has a transparent or translucent central portion 38 inscribed with at least one second directional arrow 40. Since it is spaced from the transparency and grid location by virtue of the small gears 28, the second directional arrow 40 is not see in focus. The first and second directional arrows align with each other when pointing at the North marking or 180 degrees therefrom.

Having one or both of the grid wheel and direction wheel with a translucent as opposed to transparent central portion may improve readability of the map transparency by diffusing available light evenly, provided that excessive attenuation is avoided. On the other hand, the invention clearly will work if both are transparent.

Figure 5:
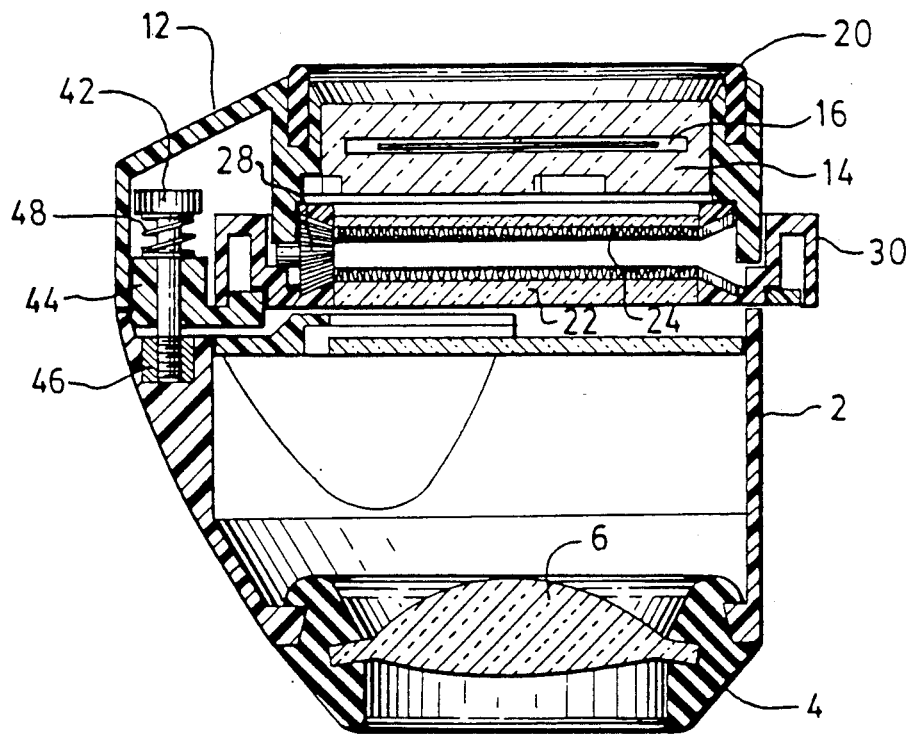
FIG. 5 is a cross-section at A—A on FIG. 2.
Figure 6:
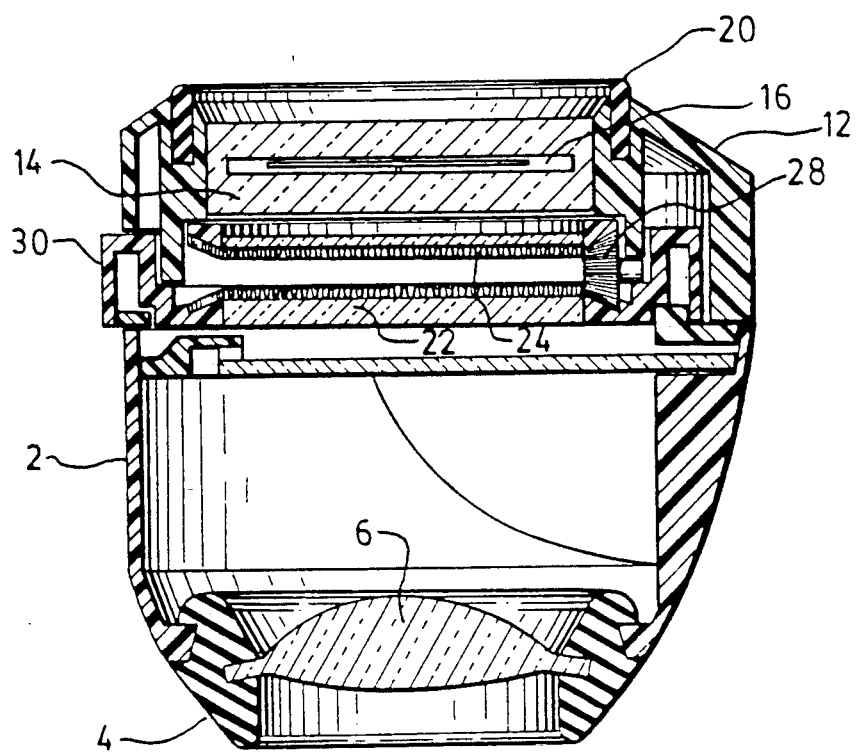
FIG. 6 is a cross-section at B—B on FIG. 2.
Figure 7:
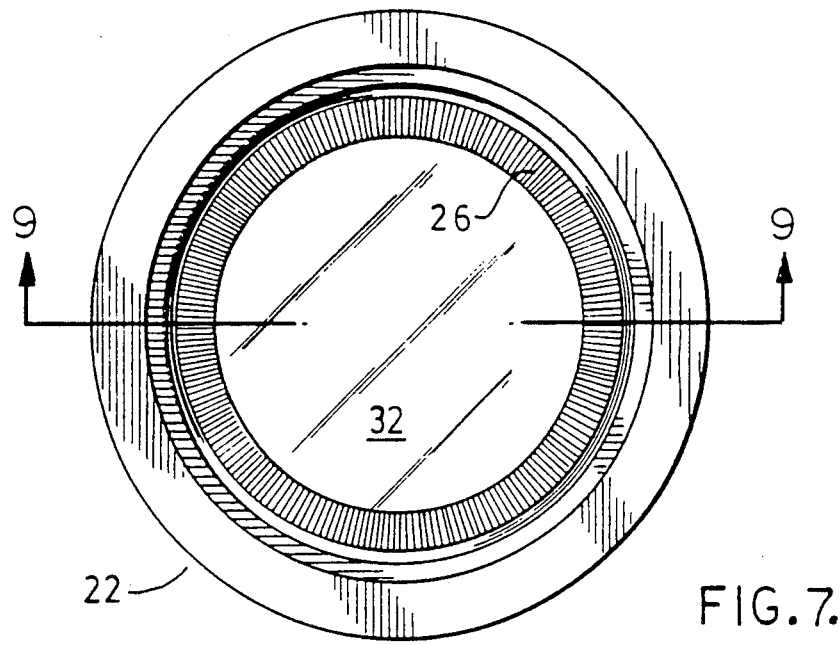
FIG. 7 is a top view of the grid ring.
Figure 8:
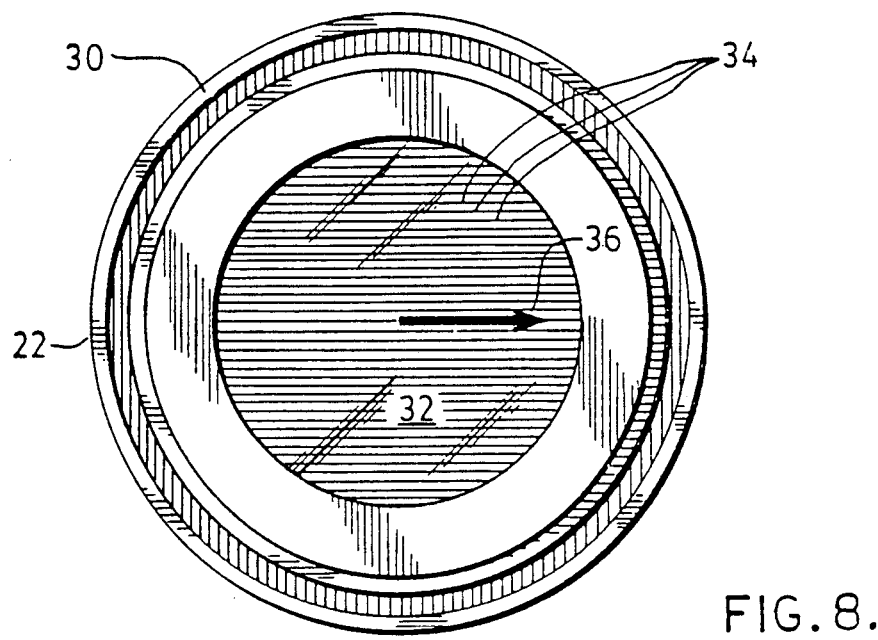
FIG. 8 is a bottom view of the grid ring.
Figure 9:
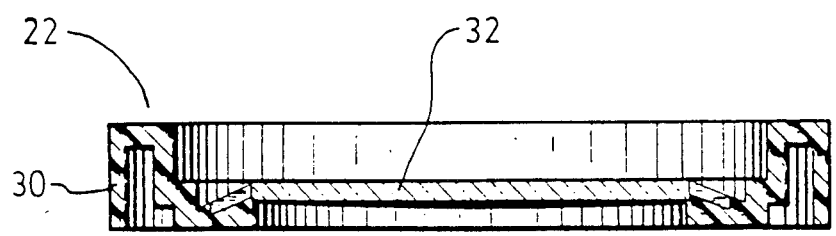
FIG. 9 is a cross-section at C—C on FIG. 7.
Figure 10:
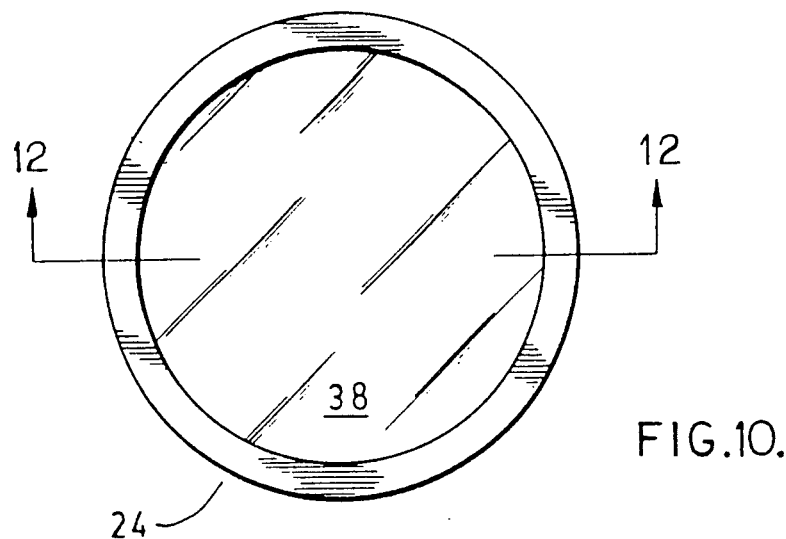
FIG. 10 is a top view of the direction ring.
Figure 11:
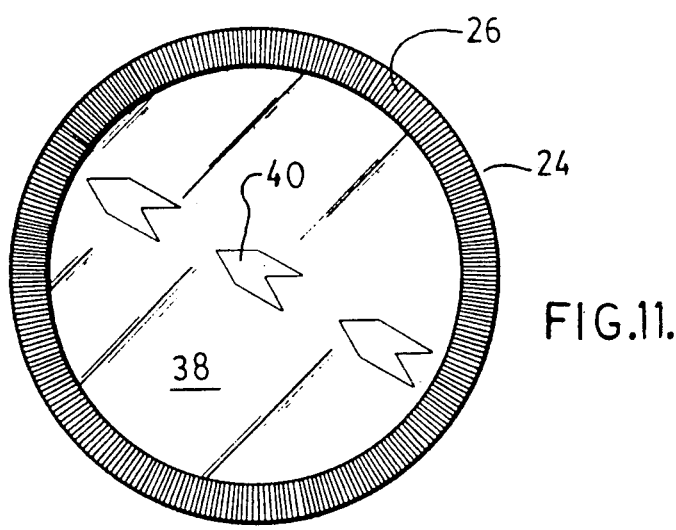
FIG. 11 is a bottom view of the direction ring.
Figure 12:
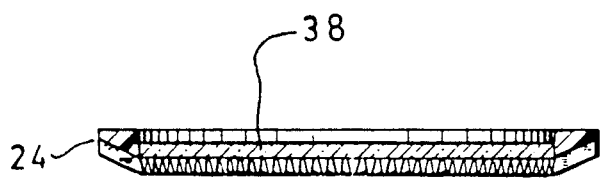
FIG. 12 is a cross-section at D—D on FIG. 10.
Figure 13:
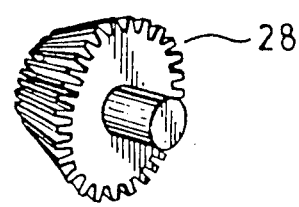
FIG. 13 is a perspective of one of the small gears.

As seen in FIG. 5, the upper and lower casings are fastened to each other via a socket screw 42 passing through a flange 44, and engaging a threaded metal insert 46 in the lower casing. A spring 48 biases the upper casing towards the lower casing. The casings can be separated to permit transparencies to be changed, by lifting the upper casing out of a detent in the lower casing against the force of the spring, to disengage the casings from each other, and then pivoting the upper casing away from the lower casing, about the socket screw 42.

The map transparency 10 must be prepared such that magnetic north is aligned with the N or North marking on the body of the compass.

The device is extremely simple to use. A bearing may be taken by looking at the map transparency through the lens 6, and manipulating the ring 30 so as to thereby rotate the grid wheel 22 and direction wheel 24, to align the grid lines and directional arrows thereon with the desired direction of travel on the map. Then the device is flipped over, and the compass needle is aligned with the North marking on the case (or on the body of the compass). The second directional arrow then indicates the bearing to be taken.

Of course, the transparency must be inserted with the correct orientation. Clear indicia must be marked on the transparency frame, e.g. "This Side Up" and/or "This Edge In", or a pattern on the transparency frame could be matched to a pattern on the transparency support. Better still, as in the preferred embodiment, it should be made physically impossible to insert the transparency incorrectly, for example by using a tapered or assymmetrical transparency frame and corresponding support, or a transparency holder with irregular notches 70, 71 as shown in FIG. 1, matching corresponding projections 72, 73 respectively.

It should be appreciated that all of the components of the device should be of plastic or other non-magnetic material, to avoid influencing the compass.

There remains a minor problem, as with all maps, in that for truly accurate readings, the transparencies must be updated periodically to account for the variation of magnetic declination with time. However, in most areas, particularly southern area, such variation is very small, well within the typical margin of error inherent in any map/compass system. Nevertheless, if desired, the transparencies could be dated, and a warning could be provided to the user cautioning against the use of outdated transparencies.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, the transparency itself need not necessarily be oriented to magnetic north. Instead, the transparency support frame could be rotatable and lockable in any position to align the map image on the transparency with magnetic north. However, such a variation, although possible, is not preferred, because it is less foolproof. The transparency could be locked in the wrong position, either through inadvertence or mistake.

As in conventional hand-held transparency viewers, a battery, switch and light (preferably red, or switchable to red by use of a red filter) could be provided to facilitate use of the device at night or in poor lighting conditions. Otherwise, the user has to use a flashlight or other light source, which he or she would have to do in any event using conventional navigation equipment.

Figure 14:
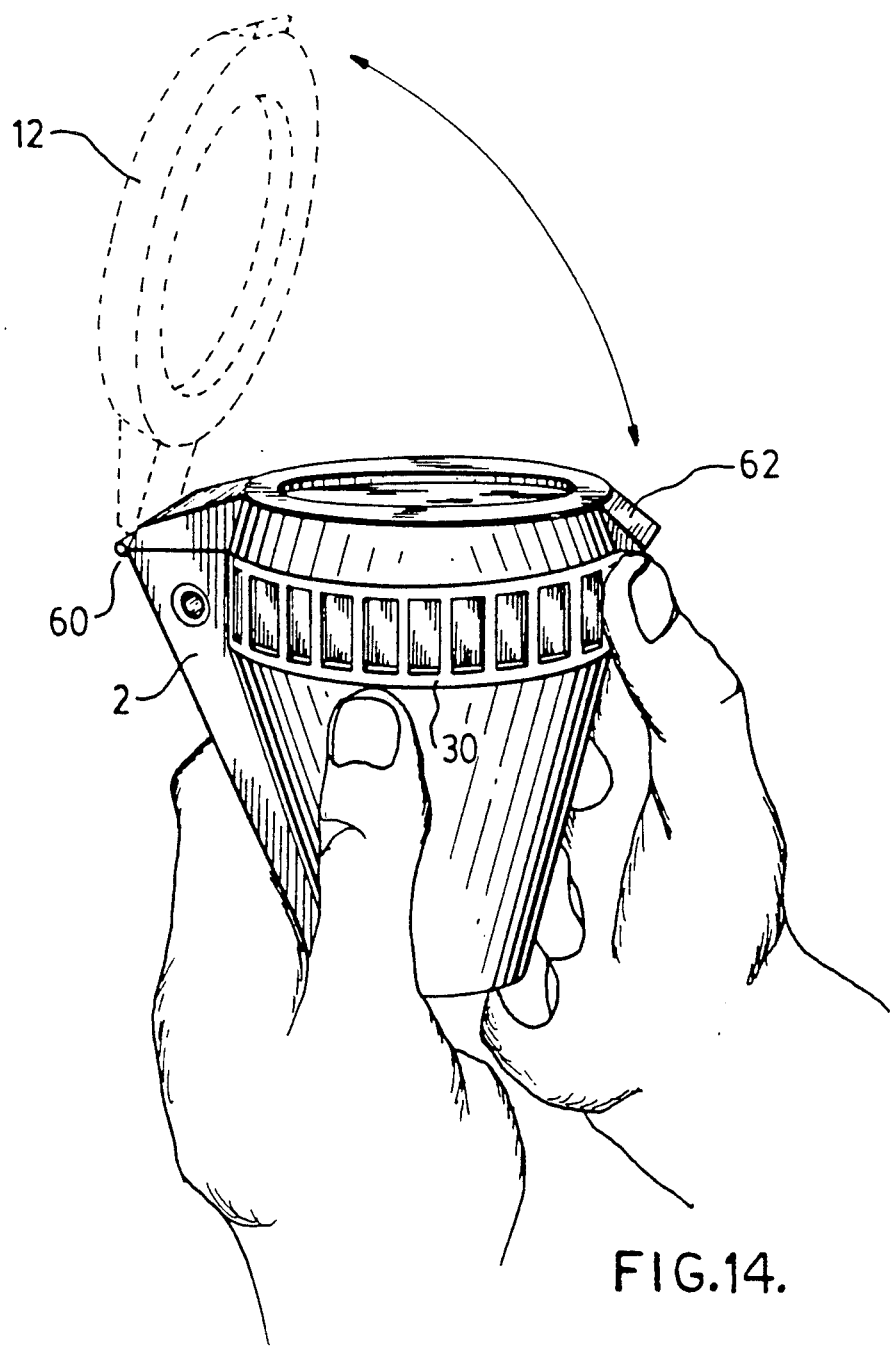
FIG. 14 is a perspective of an alternative embodiment.

Instead of the upper casing swinging away laterally from the lower casing, it could be connected to the lower casing by a hinge 60 to flip up and open. The connection between the casings could be lockable and unlockable by any suitable means, such as by squeezing spring-loaded buttons, or as shown in FIG. 14, by using an integral clip 62 to snap the upper casing to the lower casing.

The particular structure of the case is not critical. The invention resides in the various components and their arrangement, rather than in the means in which they mounted.

Instead of the map transparency being positioned between the grid wheel and the lens, it should be appreciated that it may be positioned between the grid wheel and the direction wheel, adjacent the grid wheel, although such alternative positioning is slightly more difficult from an assembly viewpoint. The transparency holder has to have slots in it to provide space for the small gears 28. The grid wheel obviously must be transparent rather than merely translucent in such an arrangement.

The invention provides a navigation device which is quick and easy to use, as well as being virtually foolproof. In addition to facilitating the taking of accurate bearings, the invention facilitates determining positions by bi-angulation or triangulation.

Since it is awkward and in some scenarios almost impossible to manipulate a large map with a compass, particularly if no table or other flat area is readily available, the invention provides a device which is likely to be used routinely, instead of being left at home. Occasions of lost hunters or hikers are thus likely to be less frequent.

Those knowledgeable in the field will readily appreciate other uses and advantages of the invention.

What is claimed as the invention is:

1. A navigation device comprising, mounted in a case parallel to and aligned with each other, said case having openings at opposite ends thereof:
   a lens across one said opening;
   a compass across the other said opening, having a body, transparent faces and a magnetic compass needle;

a North marking on said case or on said body of said compass;

a grid wheel between said lens and said compass, having a transparent or translucent central area inscribed with at least one first directional arrow, at a distance from said lens approximating the focal length of the lens;

positioned between said grid wheel and said compass, and geared to said grid wheel for counter-rotation therewith, a direction wheel having a transparent or translucent central area inscribed with at least one second directional arrow, such that said first and second directional arrows align with each other when pointed at said North marking and 180 degrees therefrom; and a transparency holder adapted to carry a map transparency with magnetic north thereon aligning with said North marking, said transparency holder being in close proximity to said grid wheel such that it is also at a distance from the lens approximating the focal length of the lens;

whereby a bearing may be taken by examining an installed map transparency through said lens, rotating said grid wheel and direction wheel to align said at least one first directional arrow with the desired direction of travel on the map, then aligning said compass needle with said North marking on said case or on the body of the compass, said at least one second directional arrow then indicating the bearing to be taken.

2. A navigation device as recited in claim 1, in which said grid wheel includes a plurality of grid lines across said transparent or translucent central area, parallel to said first directional arrow.

3. A navigation device as recited in claim 1, in which said transparency holder is between said grid wheel and said lens.

4. A navigation device as recited in claim 2, in which said transparency holder is between said grid wheel and said lens.

5. A navigation device as recited in claim 1, in which said grid wheel is transparent and in which said transparency holder is between said grid wheel and said direction wheel.

6. A navigation device as recited in claim 2, in which said grid wheel is transparent and in which said transparency holder is between said grid wheel and said direction wheel.

7. A navigation device as recited in claim 1, in which said transparency holder includes cooperating tab and slot means on said holder and said casing, whereby said holder may be installed in only one possible orientation.

8. An apparatus for converting map bearing data to the land or sea bearing, said apparatus comprising:

an open ended body member;

a lens positioned at a first open end of the body member;

a compass, having a body, transparent faces and a magnetic compass needle, positioned at the opposite open end of the body member;

a North marking on said body member or on said body of said compass; and a transparency holder positioned between said lens and said compass at a distance from the lens which is approximately equal to the focal length of the lens;

further comprising a rotatable grid wheel, having a central are which is at least translucent and is inscribed with at least one first directional arrow, positioned between said lens and said compass at a distance from the lens which is approximately equal to the focal length of the lens, and a direction wheel, having a central area which is at least translucent and is inscribed with at least one second directional arrow, positioned between the grid wheel and the compass and associated with the grid wheel for counter-rotation therewith, said first and second directional arrows aligning with each other when pointed at said North marking and 180 degrees therefrom.

9. The apparatus of claim 8 wherein the grid wheel includes a plurality of grid lines, across said central area, parallel to said first directional arrow.

10. The apparatus of claim 8 wherein said transparency holder is positioned between said grid wheel and said lens.

11. The apparatus of claim 8 wherein said grid wheel is transparent and said transparency holder is positioned between said grid wheel and said direction wheel.

* * * * *

UNITED STATES PATENT AND TRADEMARK OFFICE
CERTIFICATE OF CORRECTION

PATENT NO.  :     5,060,390
DATED       :     October 29, 1991
INVENTOR(S) :     David C. Hill It is certified that error appears in the above-identified patent and that said Letters Patent is hereby corrected as shown below:

At column 2, line 46, after the second occurrence of the word "the" insert --lens.--.

At column 3, line 10, delete "see" and insert therefor --seen--.

In claim 8, column 6, line 23, delete "are" and insert therefor --area--.

Signed and Sealed this

Twelfth Day of October, 1993

Attest:

BRUCE LEHMAN

*Attesting Officer*   *Commissioner of Patents and Trademarks*